Dec. 27, 1966  J. J. ANTUL ET AL  3,294,891

LAND MASS SIMULATOR

Filed Jan. 27, 1964  4 Sheets-Sheet 1

INVENTORS
JOHN J. ANTUL
BY MELVIN E. SWANBERG.

R. E. Geauque
ATTORNEY

United States Patent Office 3,294,891
Patented Dec. 27, 1966

3,294,891
LAND MASS SIMULATOR
John J. Antul and Melvin E. Swanberg, both of Claremont, Calif., assignors, by mesne assignments, to Conductron Corporation, Ann Arbor, Mich., a corporation of Delaware
Filed Jan. 27, 1964, Ser. No. 340,128
2 Claims. (Cl. 35—10.4)

This invention relates to apparatus for training personnel in the operation and use of radar equipment and more particularly relates to apparatus capable of simulating an airborne radar display of terrain information.

Aircraft simulators comprising ground based equipment providing realistic environments are commonly used for the teaching and practicing of aircraft flight and navigation techniques. Simulators provide a saving of time, materials, and apparatus required, with the hazards of airborne teaching eliminated. To achieve realism and maximum teaching results, simulators often comprise units that faithfully represent stations in the aircraft and contain instruments, computers and radar apparatus of the type actually used during real missions.

Radar land-mass simulators recreate radar controlled flights over specific terrain and are used to train navigator bombardiers. Devices of this type currently in use utilize the principle of reflected ultrasonic pulses from three-dimensional maps for this radar flight simulation. As aircraft speeds and ranges increase and low-altitude requirements materialize, the additional ground area covered will automatically, by virtue of the scale ratio, increase the size of the maps required. Training units based upon ultrasonic techniques, which are already large, would then become impractical. In the present invention, map information is recorded in terms of optical density in independent layers of color film. The readout system comprises electro-optical apparatus which converts the light densities of the film into corresponding electrical signals. Basically, the multi-color map is a spectral-photographic technique in which the high-density data storage made possible by conventional photographic methods is further increased by integrating color to form a multi-color film transparency. In this system each color supplies additional storage surfaces. The data storage capability of the present invention is sufficient to store substantially more information per square inch than prior storage devices employed in land mass simulators and therefore is adaptable to the future requirements of training devices for bombardier/navigators. The apparatus of the present invention, with its increased scale ratio over prior devices, provides a trainer/simulator which not only has a reduced size with improved accuracy, but one which has enough potential to keep pace with the state of the art. For example, space vehicle operators could be trained in radar navigation and safe return to earth. This ability to store vast quantities of information in limited space could reduce the entire earth surface to the equivalent of a few feet. Thus, an astronaut could be indoctrinated and "checked out" in radar navigation on global missions by flying a simulator prior to an operational flight. It is also possible to store, relative to the earth's coordinate system, elevation, pressure, temperature, gravity deviations, electromagnetic data, etc., and relate the readout to a moving frame of reference.

Airborne radar apparatus ordinarily uses a cathode ray tube (C.R.T.) to display information obtained from transmitted pulses reflected back from objects or terrain. In the display apparatus, an electron beam may scan lines radially from an initial point representing the location of the aircraft itself and blips representing various objects or targets will appear at radial distances from the initial point corresponding to the range or distance that the actual object or target bears with respect to the aircraft. This type of display is referred to as a plan position indicator. Thus, the radar provides a map-like display with various terrain features and other objects appearing as blips in scaled relation with the aircraft's position.

To simulate the function of an airborne radar, the apparatus of the present invention employs a high intensity spot of light, generated by a flying spot scanner, which is scanned across a three-color map transparency in a manner similar to a PPI scan. The light is projected by an appropriate lens and transmitted through the map where it is modulated in three spectral bands according to the densities of the three dye layers in the film. The transmitted light is collected, separated into the three spectral bands, and focused onto three photomultiplier tubes (PMT). As the scanner simulates the scan of an airborne radar, a time varying voltage will be generated by each PMT. The PMT output signals represent the basic data (terrain height, and reflectivity) that was coded into the color map and may be used as synthetic video signals. The signals are processed in wide-band electronic computers to generate three-dimensional effects and special effects. Scanner and optics simulate radar antenna motion while map motion simulates aircraft travel. No altitude motion is required since the effects of altitude are developed by novel electronic techniques as will be described hereinafter. The output is a simulated radar video signal that can be presented on actual or simulated radar display equipment.

The basic requirement for radar land mass simulation is a record medium capable of storing a large quantity of data representing the area of interest. The minimum of two parameters (terrain height and radar reflectivity) must be stored with resolutions on the order of, or greater than, the maximum capability of the radar system. These stored data must be readily accessible in a form that can be conveniently handled and processed to generate the required video signals. This last requirement implies that the two parameters must be read out simultaneously in a form similar to a radar scan; that is, radially scanned at a rate comparable to radar time. A multi-color film transparency in accordance with the present invention fulfills the requirement as a storage medium. Color film has a distinct advantage over photographic means and methods used heretofore, such as multiple black and white transparencies, since registration requirements are met in the laboratory by skilled personnel under optimum conditions. The image is thus stored in dyes and remains in permanent registration. Due to the large dynamic range of terrain height, two colors are used to store the altitude data. A coarse-fine coding scheme, to be described in detail hereinafter in connection with the discussion of the novel terrain height computer, is used. Radar reflectivity is stored in the third dye. The terrain and reflectivity data are stored in the dye layers, yellow, cyan, and magneta, which have been exposed and developed in accordance with the major and minor terrain variations and radar reflectivity, respectively. If an aircraft radar scans a terrain feature such as a mountain an area behind the mountain may be out of the line-of-sight of the radar; therefore, the radar display will have a blank "shadow" area immediately behind the bright area corresponding to the face of the mountain. The present invention provides an improved method and means employing novel circuits for simulating a radar display having shadows or blank areas behind terrain features such as mountains. The terrain data channel outputs are processed with the aircraft altitude signal to produce a signal with amplitude proportional to instantaneous aircraft height above the terrain being scanned. This signal in turn is used to develop shadows and slant range corrections. The shadow signal blanks the video to mask targets obstructed by hills. Data are obtained from the transparency on a ground range time base since it is read by a spot being scanned radially at a constant rate beginning at the aircraft position. Airborne radar obtains video data on a slant range time base. The conversion from ground range to slant range is made in this invention by recording the processed radar video data on the phosphor of a scan conversion tube as a function of the computed slant range distance from the aircraft to the ground. The data are then read from the scan converter on a linear time base; thus video signals are delayed the proper amount to simulate the slant range operation of the airborne radar set.

Other radar return effects which are simulated are: radar pulse width, antenna beamwidth, antenna tilt, vertical and horizontal aspect effect, vertical beam pattern, earth curvature, and variation in certain cultural returns with altitude (antenna towers, bridge towers, etc., including front-edge brightening effects, far-shore brightening, and special low-altitude target effects). System features include automatic low-altitude flight simulation accurate to distances of the order of ±25 feet of the set-in terrain clearance; PPI, offset, sector, displaced and crosshair centered scan displays either line-of-sight or North oriented; speed to approximately Mach 3 at altitudes from zero to 100,000 feet in interconnection with an operational radar/computer system.

Inasmuch as the derived video output signal is a function of the amount of light transmitted through the map transparency, it is important that the illumination provided by the flying spot scanner be maintained constant to a relatively high degree of precision. In order to obtain a uniform illumination under various operating conditions and to overcome the effect of drift, fatigue, and other instabilities of the photomultiplier tubes as well as to insure the overall precision of the system, novel and improved regulating, calibrating, and stabilizing means are provided in the apparatus of the present invention. Also, a number of protective circuits are included in the present invention, such as a sweep failure protection circuit, which act to prevent severe burning of the flying spot scanner phosphor or damage to the photomultiplier tubes under all conditions of malfunction, including openings in any of the circuit paths.

In order to realistically simulate the many varieties of conditions encountered in actual airborne radar controlled flights, the present invention includes a number of novel data processing circuits, a number of which comprise special-purpose computers. These computers include the height-above-terrain computer, horizontal beam pattern computer, shadow computer, aspect computer, vertical beam pattern computer, slant range computer, low-altitude automatic flight computer, and the special effects computer. Structural details and the novel functions of these data processing circuits and computers will be described hereinafter.

The invention resides partly in the physical and electrical structures and interrelationships embodied in the multicolored maps, the electro-optical system comprising the flying spot scanner and the photomultiplier pickup assembly, and the various data processing circuits of the system, as herein specifically illustrated, but also embraces the concept of the system itself, considered as an integrated whole, and independently of the structural details of its several parts.

It is therefore, a principal object of this invention to generate simulated radar signals by scanning data stored in a plurality of spectrally independent layers of attenuating media.

Another object of the invention is to provide a calibrated light source and means of scanning map transparencies so that accurate analog data stored therein may be read out through electro-optical means.

A further object of this invention is to provide improved apparatus for simulating a radar display of terrain wherein elevational information of the terrain is obtained by scanning a two-dimensional map record.

Another object of the invention is to provide novel and improved apparatus for computing shadowed areas, and for blanking the display in the areas of shadow.

It is another object of this invention to provide an improved radar simulation apparatus having means for scanning a multi-colored map and having a pickup and display means as in a closed circuit television system.

Yet another object of this invention is to provide a novel two-dimensional data storage device capable of providing three-dimensional terrain elevation information for use with equipment which responds to three dimensional information.

Still another object of this invention is to provide novel and improved two-dimensional color transparency apparatus for storing three-dimensional terrain contour data.

Still another object of this invention is to provide landmass simulation equipment which is responsive to photographic records containing three-dimensional data coded in the form of three-color dye densities.

It is an object of the invention to provide radar landmass simulation equipment which is compatible with conventional trainer and/or radar display apparatus and thereby provide an integrated system.

An object of the invention is to provide means for correcting angles in the Lambert conformal projection system in a radar land-mass simulator utilizing stored maps and thereby provide faithful simulation of radar PPI displays.

Still another object of the invention is to provide a novel and improved overlay mask system for use in a radar land-mass simulator whereby various modifications can readily be obtained in the simulation of the antenna pattern.

It is another object of the invention to provide novel electronic circuit means in a radar land-mass simulator for readily modifying the azimuth pattern to simulate a variety of horizontal antenna beamwidths.

An object of the invention is to provide novel means in flying-spot scanner apparatus as used in a radar landmass simulator which will vary the horizontal area of illumination by spreading the scanning light in azimuth as a function of slant range to simulate the small target attenuation and horizontal aspect effects.

Another object of the invention is to provide radar simulation equipment having a flying-spot scanner with novel sweep-to-sweep beam spread means to simulate the increase of the azimuthal extent of point targets.

Another object of the invention is to provide novel and improved aspect computer apparatus for use in radar landmass simulation equipment.

Yet another object of the invention is to provide novel and improved vertical beam pattern generator apparatus for use in radar land-mass simulation equipment.

A further object of the invention is to provide novel and improved height computer apparatus, in which vertical detail to be read are encoded in terms of coarse and fine data, for use in radar land-mass simulation equipment.

Another object of the invention is to provide novel and improved protection circuits for use in flying spot scanner apparatus of the type employed in radar land-mass simulation equipment.

Still another object of the invention is to provide novel and improved dynamic focus means for use in flying spot scanner apparatus of the type employed in radar land-mass simulation equipment.

Yet another object of the invention is to provide novel and improved automatic brightness control apparatus for use in a flying spot scanner to compensate for variations in phosphor efficiency and thereby improve the performance of radar land-mass simulation apparatus.

A further object of the invention is to provide novel and improved means for the automatic standardization of the gain of a photomultiplier tube and thereby compensate for variations in photomultiplier tube sensitivity.

A still further object of the invention is to provide in the flying spot scanner apparatus of a radar land-mass simulator, a cos⁴ and vignetting compensation computer to compensate for spot position effects and off-axis light losses.

It is an object of the invention to provide novel and improved means for variable radar pulse length simulation in radar simulation equipment.

Another object of the invention is to provide novel and improved electronic masking circuits for minimizing crosstalk between the channels of a multi-color photographic record of the type employed in radar simulation equipment.

Yet another object of the present invention is to provide novel and improved signal conditioning circuits employing peaking, peak clipping, base clipping and the like for the simulation of cultural targets, "far shore brightening" and the like in radar simulation equipment.

Another object of the invention is to provide a means to monitor and correct the photomultiplier sensitivity so that the system can read out the stored data with a high degree of accuracy.

It is also an object of this invention to combine information channels that contain common data, such as terrain height, by using maximum data storage capabilities through multiplexing techniques.

Another object of the invention is to simulate horizontal aspect effects by the introduction of optical analog functions that produce horizontal beamwidth effects.

Another object of the invention is to provide means responsive to an encoded height-above-terrain signal to produce a simulated radar altimeter reading.

Yet another object of the invention is to provide, in a radar simulator, novel means for converting ground range data to slant range data.

Still another object of the invention is to provide a novel and improved slant range computer for use in a radar land-mass simulator.

It is yet another object of the invention to provide a novel vertical beam pattern computer, the output of which modulates the reflectivity information in a radar simulator, said computer including a tilt integrator of novel construction.

Other objects of the invention will in part be obvious and will in part appear hereinafter.

The features of this invention which are believed to be novel are set forth with particularity in the appended claims. The present invention itself, both as to its organization and manner of operation, together with further objects and advantages thereof may best be understood by reference to the following description taken in conjunction with accompanying drawings, which like reference characters refer to similar parts and in which:

Figure 1:
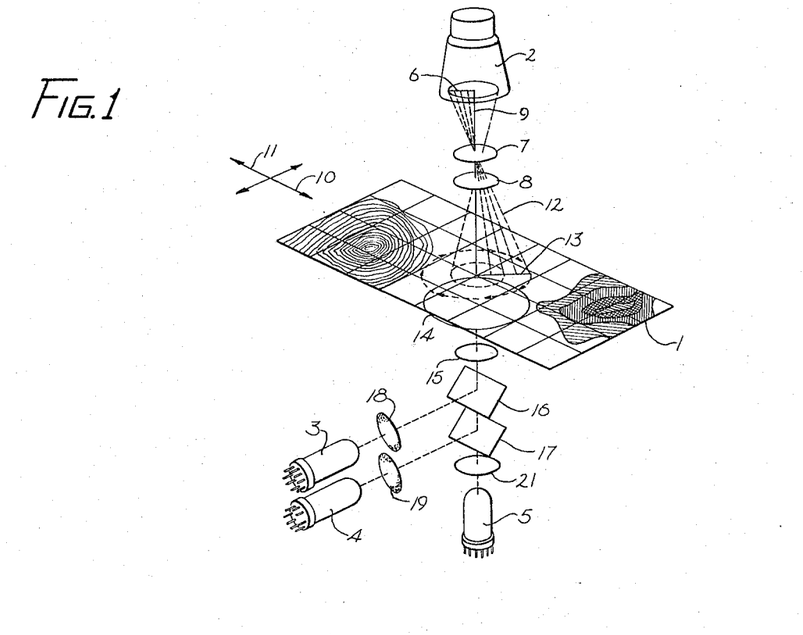
FIGURE 1 is a somewhat diagrammatic perspective view of an arrangement for scanning a multicolor map transparency to generate video signals in accordance with the invention.

Looking now at FIGURE 1 there is shown a map transparency 1 containing contour and reflectivity information represented by various dye layers; this transparency is scanned by flying spot scanner 2 and three photomultiplier tubes 3, 4, and 5 which develop video signals therefrom. The flying spot scanner 2 may comprise any suitable well-known means for illuminating the map 1 with a rotating sweep in a manner similar to a PPI scan. The sweep line of the light dot is indicated at 6 and the rays therefrom are projected by projection lens 7 or 8. A lens drive system, to be described hereinafter, is used to select one or the other of lenses 7 and 8 to provide the desired range adjustment of the apparatus. The zero sweep line is indicated at 9. Flying spot scanner 2 scans the multicolor transparency map 1 in rectangular coordinates 10 and 11 which corespond to the horizontal flight path coordinates of the simulated aircraft. The projected light ray 12 traces an azimuth scan 13 on the map 1. Light (transmitted through the multicolor map 1) is controlled by the dye density in each independent information channel of the map. Collecting lens 14 together with lens 15 comprises a demagnifier system which directs the light to dichroic filters 16 and 17. Dichroic filters 16 and 17 may comprise high-reflectance dichroic mirrors. Filter 16 is a low-pass high-reflectance mirror which reflects blue light and passes red and green light. Filter 17 is a high-pass high-reflectance mirror which reflects red light and passes green light. Light reflected by filter 16 is transmitted through blue relay lens 18 to photomultiplier tube 3. Light transmitted through dichroic filter 16 impinges on dichroic filter 17 and is transmitted through red relay lens 19 to photomultiplier tube 4. Light transmitted through dichroic filter 17 is transmitted through green relay lens 21 to photomultiplier tube 5. The separated colored lights thus are directed through relay lenses 18, 19, and 21 which also serve as color-band-pass filters to select the optimum spectral band and are designed to take advantage of film dye characteristics for maximum separation of the color channels. In this manner, the light transmitted through the map 1 is collected and split into the corresponding color channels by the dichroic filters where it is detected by photomultipliers 3–5. The signal amplitude from each channel is a function of the respective dye densities coded on the map 1. The scanner 2 and its related optics simulate antenna motion while the motion of the map 1, along coordinates 10 and 11, simulates aircraft travel. No altitude motion is required since the effects of altitude are developed by electronic techniques to be described hereinafter.

The flying spot scanner 2 is responsive to sweep circuits which will be described more fully hereinafter.

Figure 2:
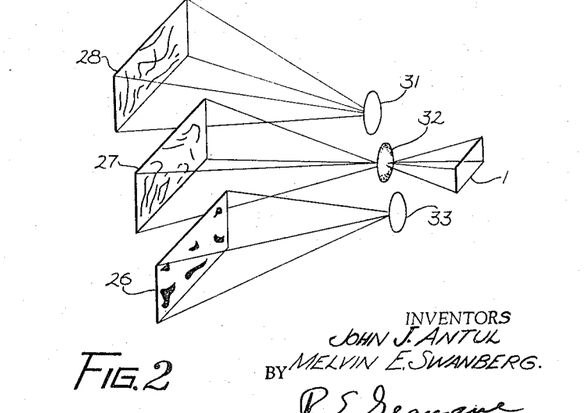
FIGURE 2 illustrates the preparation of the three-color transparency from separation masters.

The manner in which data are compiled and transferred from conventional contour maps to the map transparency is illustrated in FIGURES 2A and 2B, and will now be briefly described. A conventional source map of the area of interest is divided into a plurality of sections for compilation. A suitable overlay, such as a Lambert conformal conic grid overlay is placed over the source map to establish a compilation scale and the required contours are traced, each on a separate overlay. These overlays are photographically reproduced. The photographic reduction is printed for each level at a scale of 1:1,500,000 on high-contrast black and white films 26–28. The film 28 contains fine contour shading information, and the film 27 contains coarse contour information. The film 26 contains the selectively data. The three-color film transparency 1 is made by exposing each of the black and white films separately with the appropriate color filter 31–33 as shown in FIGURE 2B thus producing a final multicolored single transparency 1. The resulting map 1 is a single plate, three-color film transparency hermetically sealed between glass plates and permanently mounted in a metal frame. The variable dye densities in the transparency map 1 modulate red, green, and blue light. The green, green-yellow, yellow appearing areas represent cultural areas of high radar reflectivity while the red, red-blue, areas represent terrain features. In this coding, water at sea level appears red while bodies of water at higher altitudes appear as various shades of blue-red to dark purple dependent on the height above sea level.

Figure 3:
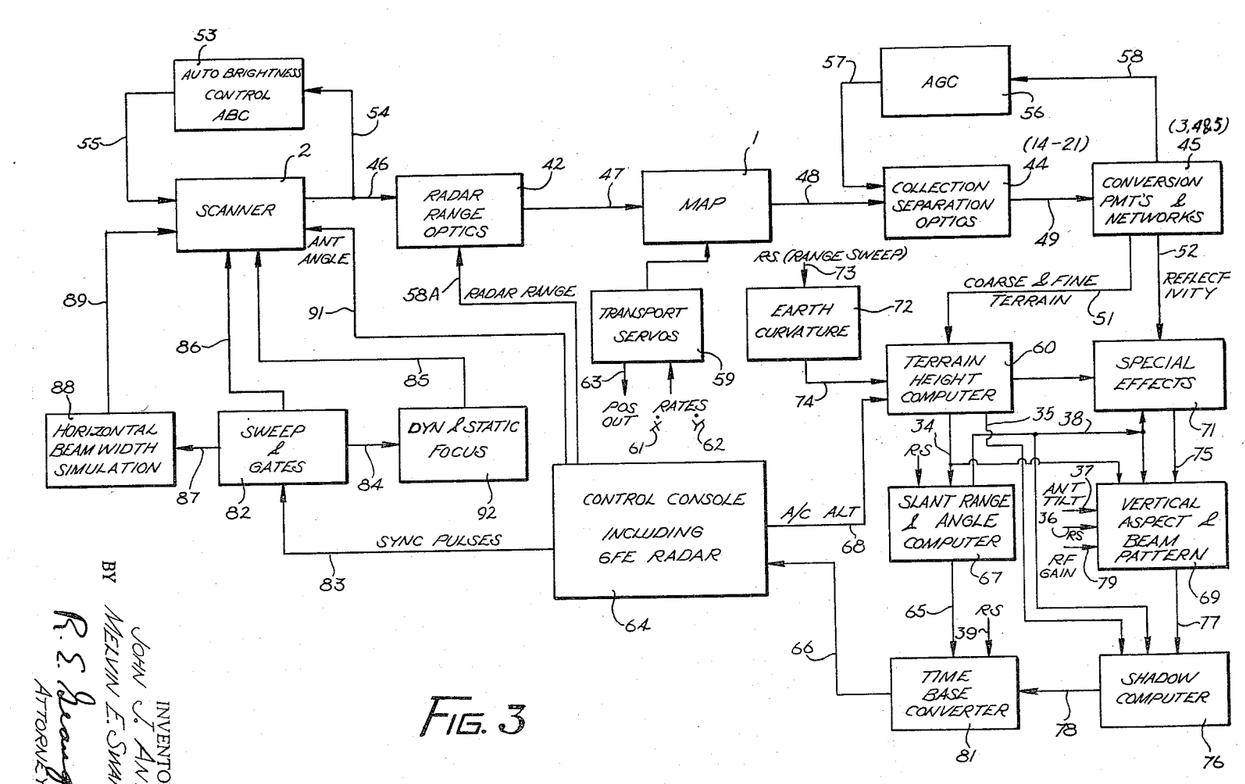
FIGURE 3 is a simplified block diagram of a land-mass simulator in accordance with this invention.

Looking now at FIGURE 3 there is shown a simplified block diagram of the land-mass simulator system. The flying spot scanner 2 is deflected by the resolved sweep in the radar antenna pointing direction. The light spot is focused by the radar range optics 42 (embracing lenses 7 and 8 of FIGURE 1) on the multicolor map 1 where it is modulated by terrain elevation and target reflectivity data encoded therein, in the manner described hereinabove. The light transmitted through the map 1 is collected and separated into three spectral bands via optics 44 (equivalent to elements 14–19 and 21 in FIGURE 1) and thereafter focused onto three conversion photomultiplier tubes and associated networks, represented generally by the numeral 45. The photomultiplier tubes (PMT) within the block 45 are equivalent to the PMT's 3, 4 and 5 shown in FIGURE 1. The PMT output signals comprise coarse and fine terrain height data on line 51 and reflectivity data on line 52, as required for generating synthetic video signals. Automatic brightness control (ABC) 53 (upper left of FIGURE 3) is used to compensate for any nonuniformity of phosphor efficiency over the face of the cathode ray tube comprising scanner 41. A fraction of the C.R.T. light output is routed via input 54 to the ABC 53. The C.R.T. light output supplied via input 54 is continuously compared with an internal reference in the ABC 53, to develop an error control signal which appears on line 55. The gain of ABC 53 is adjusted during every range sweep and the error signal thus developed on line 51 increases or decreases the C.R.T. beam current of scanner 41 to standardize the light output during each sweep.

Additionally, the gains of the MT's (45) transmitted on line 58 to an automatic gain control 56 are standardized during every system dead time. The system dead time is during the tail cone blanking, the lens changing cycle, and during a short interval while sector reversing. During each system dead time the C.R.T. is blanked, and the PMT output obtained from a standard lamp is sampled and compared with an electrical standard in the automatic gain control (AGC) 56. The resultant error signal operates a servo to alter the PMT supply voltage. The standard lamp illuminates the PMT via input 57 at all times although it is actually used only during the PMT calibration cycle. The standard light, being a known constant, does not interfere with the servoing of C.R.T. light during a C.R.T. sweep.

Radar range changes are achieved by selection of a lens giving the desired magnification, in the radar range optics 42, under the control of a signal on line 58A (see also lenses 7 and 8 in FIGURE 1). The spot size and sweep length are magnified by the selected lens to simulate the radar pulse length. The projection lens changing mechanism maintains focus and alignment through the changing range cycle.

Map 1 is held in an X–Y transport mechanism which moves the map in a horizontal plane under the control of transport servos 59 to simulate horizontal aircraft motion. The instructor's console and the radar display are indicated at 64. X and Y rate inputs to the transport servos 59 are supplied on lines 61 and 62 from control console 64, and a position output signal to the console is available in line 63.

Aircraft flight positions, computed in a rectangular coordinate system using the X and Y rate signals appearing on line 63, may be used to control plotters and/or related training equipment. The transport servos 59 operate as integrators and develop smooth X and Y position signals which then become the precise positional reference system for the entire trainer. Latitude/longitude computer simulator operation is slaved to the map data servos with suitable corrections being made for the scale of latitude/longitude as compared to the map drive reference grid.

The output signals appearing on lines 51 and 52 are processed in wide-band electronic computers to generate the three-dimensional effects and special effects desired. These computers include the terrain height computer 60, the special effects computer 71, the vertical aspect and vertical beam pattern computer 69, the slant range angle computer 67, and the shadow computer 76. Additional computing circuits will be described in connection with FIGURES 4 and 5. The outputs from the various computers are supplied to time base converter 81 which modifies the scan to be compatible with the display equipment. The modified output comprises a simulated radar video signal that can be presented on actual or simulated radar display equipment in console 64.

As stated hereinabove, terrain height is coded in coarse steps and fine steps. The fine electronic channel is analog in nature, and the number of fine steps per coarse step can be increased indefinitely as desired as a part of the map making process. The coarse and fine PMT voltages on line 51 are linearized by means of suitable function generators in the terrain height computer 60 to cancel the non-linear coding used in the transparency. It is combined in circuits that use logical and analog techniques to form the height analogs appearing on output lines 34 and 35. The terrain height computer will be described more completely in connection with FIGURE 5. One important low altitude radar effect is that as aircraft altitude is reduced the horizon appears at shorter and shorter ranges due to earth curvature. This effect is simulated by modifying the terrain height signals to include the geometry of earth curvature. The earth curvature signal provided by circuit 72 is derived from the range sweep appearing on line 73 and is computed to simulate the atmospheric refraction affect which produces a downward bending of electro-magnetic radiation. The input to the terrain height computer 60 from the earth curvature circuit 72 appears on line 74.

The aircraft altitude signal on line 68 is combined with the terrain height signal appearing on line 51 to provide the aircraft height above the terrain signal appearing on lines 34 and 35. The height analogs (34, 35) representing height of aircraft above terrain and terrain height above sea level are used in the computation of a slant range and angle (67) and the generation of vertical aspect effects (69) and shadows (76).

The slant range and angle computer 67 computes angle and range signals from the aircraft altitude above terrain and ground range sweeps on line 34 and range sweep (RS) respectively. Slant range on line 65 is used to convert the video signals to real radar time by the time base converter 81. All the slant range angle information in the form of a transient signal on line 38 is used to generate special effects, vertical aspect and shadow aspect.

The radar reflectivity information on line 52 is modified by the special effects generator 71 which decodes special target effects such as far-shore brightening, cultural target leading edge enhancement and special low altitude targets. These special target effects are in general the effects caused by vertical targets, such as towers, and buildings, which extend into the radiation pattern when viewed at nearly horizontal angles. The special effects computer generates these effects as a function of the illumination angle on line 38. The modified reflectivity information on line 75 is further modified by the vertical aspect and beam pattern computer 69. Vertical aspect effect is that effect of radar reflectivity due to angle of incidence that electromagnetic energy strikes the terrain. The terrain height information on line 34 and illumination angle on line 38 are used to compute the proper reflectivity modification; the effects of the vertical beam pattern are computed from the ground range sweep signal on the line 36, antenna tilt signal on the line 37, aircraft altitude above terrain signal appearing on the line 34 and the function representing the antenna beam pattern. This computer generates an antenna gain signal as a function of position of terrain or target with respect to the antenna vertical radiation pattern including the range attenuation effects. This antenna gain function is multiplied by the receiver gain function on line 79 and modifies the incoming reflectivity data on line 75 in accordance to the computer gain function.

The modified radar reflectivity signal on line 78 is then gated on and off in accordance with a shadow effect computed by the shadow computer 76. The shadow gate information is computed from terrain height 35 and illumination angle 38 by analog techniques which compute terrain height variations with illumination height variations. Shadows are generated by gating off the reflectivity information when terrain falls below the height of illumination.

The modified radar reflectivity signal on the line 78 is then converted to real-time signals by the time base converter 81. The slant range signal on the line 65 is used to position the data in storage and is read out as a function of real radar sweep time signal on the line 39. The simulated radar signal on line 66 is then used in a normal manner by actual or simulated radar equipment 64. All normal functions of radar operation can be performed such as navigation, tracking, and bombing due to the unique nature of the simulated video signal on line 66.

By spreading the scanning light source as a function of slant range, tangential to the scan direction, the azimuth beam width of the radar energy pattern may be simulated. That is, horizontal aspect angle affects radar returns due to the distribution of radiated energy and the angle of incidence of the beam striking the reflecting surface. This effect is simulated by spreading the scanning light source as a function of slant range. In addition to small target signal strength variations, this simulation technique provides the azimuth resolution degradation produced by the antenna beam width and contributes to directional effects. The azimuth beam width is approximated by the spot diameter of the image light source on the map at high-incident angles (directly below the aircraft) and is modulated to produce beam width-spreading as a function of slant range.

The flying spot moves in a straight line over the map starting from the coordinates of the aircraft and traveling in a direction of antenna heading. The line scan repeats at the approximate rate of the simulated radar pulse repetition rate, and the velocity of the flying spot, in terms of map scale, is aproximately one-half the velocity of light (one-half accounts for radar round-trip distance being double). Because the velocity of the flying spot on the map is constant, the video derived from the map is on a time scale strictly proportional to the ground range from the aircraft. The terrain height information is decoded off each point of the map as the spot sweeps over the map and is converted into an analog of terrain height versus ground range. The earth curvature (from 72) is next added to the terrain height analog (in 69). The earth-curvature-connected terrain height analog and aircraft height are used to compute the location of shadows (in 76) and the video is blanked accordingly, on a point-by-point basis. The shadow-blanked, ground-range-based video is converted to a slant range base in the scan time base converter 81 and thereby becomes simulated radar video.

Having described the basic system, the land mass simulator of the invention will now be described in greater detail in connection with the expanded diagrams of FIGURES 4 and 5. Signals from the sweep and timing generator 93 are fed to a sine-cosine resolver 94 where the linear sawtooth sweep waveforms are resolved into sine and cosine components in accordance with the direction in which the simulated antenna is pointing with respect to the data source. The resolver outputs are supplied to the scanner deflection coils 95 via deflection amplifier 82. Current feed back from the sine and cosine (X and Y) deflection coils to sweep deflection amplifier 82 is used to maintain deflection linearity. These resolved sweep signals are amplified in the sweep deflection amplifier 82 and supplied to the X and Y deflection coils 95 in the flying spot scanner 2, magnetically deflecting the high-intensity spot of light radially at a linear rate. The sine-cosine D.C. resolver 94 converts data from polar to cartesian form. The polar form data consists of electrical signals corresponding to a vector amplitude and a mechanical shaft angular position corresponding to vector direction. The output data in cartesian form consists of two electrical signals representing X and Y vector equivalents of the inputs.

A pellicle 96, comprising a thin, transparent plastic membrane stretched over a rigid frame, in the path of the flying spot scanner beam deflects a small percentage of the light of the beam which is compared by photomultiplier tube 97 with a standard light source 98, monitoring the light emitted from the face of scanner 2. Source 98 is energized from regulated supply 99. The photomultiplier tube 97 is energized by supply 101 via control 102.

During each range sweep fly back the flying spot scanner is blanked and the PMT 97 detects only the light from the standard lamp 98. By sampling the amplified PMT output signal on line 103 changes in the operating characteristics of the PMT 97 can be detected. This sampling can be accomplished by a simple peak detector reading of the minimum signal occuring on line 103 when the light falling on PMT 97 is reduced to the blanking of the flying spot scanner. This peak detected signal is compared with an electrical standard and is used to correct the gain of the PMT 97 by varying the high voltage of the automatic gain control circuit 56 via servo motor 104 which drives control 102. Operational amplifier 105 amplifies the detected error signal to AGC 56.

Simultaneously, the sine/cosine signals impressed upon deflection coils 95 are fed to restoration resolver 105A. The restoration resolver 105A computes the vector sum of the two X and Y deflection coil currents that develop voltages across associated resistors in the circuit. A change rate of these vectors summed X and Y current (derivative) is proportional to the flying spot scanner 2 velocity. The flying spot velocity therefore is predetermined to be an acceptable rate when the derivative of these voltages is a certain preset value.

The resolved signal is then passed to sweep failure protection gate circuit 106, which circuit is so constituted that perfect reproduction of the original sweep signals must occur. If the derivative of the resolved signal from resolver 105A is too low, or if no signal appears, the gated amplifier of the ABC 53 will not gate on. Sweep failure protection circuit acts to prevent severe burning of the flying spot scanner phosphor by gating the flying spot scanner off under all conditions of malfunction, including openings in any of the circuit paths. Acceleration voltages are supplied to scanner 41 from power supply 107. Dynamic and static focusing are provided by focus driver 92 which energizes focus coil 108.

Photomultiplier tube 97 and the automatic gain control 56 form a closed loop, the constant signals of which are delivered from photomultiplier tube 97 to ABC 53 via line 109 and thence to flying spot scanner 41 via line 111, maintaining a constant light source. The voltage on the line 111 controls an electrode in the scanner 2, such as the cathode or control grid, to control the beam intensity, as is conventional in the art.

Corrections introduced into the PMT amplifier 105 from $cos^4$ correction circuit 112 compensate for variable light losses in the optic system. This circuit (112) is responsive to input signals derived from the automatic gain control gate generator 113, the sweep and timing generator 93, the restoration resolver 105A, and the range selector (42). The computed output on line 114 causes the ABC (53) to brighten the flying spot at points away from the center of the scanner base and thus compensate for $cos^4$ and vignetting off-axis light losses. In this way, the absolute light flux falling on the map 43 is maintained constant with reference to standard lamp 98 regardless of spot position, phosphor efficiency, or PMT sensitivity.

The separate range lenses 7 and 8 provide different magnification, allowing a selection of the desired radar range. It should be understood that any required number of range selection lenses may be used. Projection lens drive 116 provides this range switching function. The light transmitted through the map 1 is collected by one of three selectable lenses 117–119 (comparable with the lens 14 in FIGURE 1) that are controlled by collection lens turret drive 121. Shutter control 122 and shutter control 123 interpose shutters 125 and 126, respectively, into the light paths of PMT's 3, 4 and 5, in response to protective circuit 128 to prevent ambient or extraneous light from entering the PMT's.

The spectrally modulated light from the collection optics is separated by dichroic filters 16 and 17 onto the appropriate PMT's 133–135. To compensate for drifting characteristics exhibited by the PMT's (133–135) from such causes as power supply variations, temperature changes, and aging, automatic calibration occurs during system dead time. An automatic gain control gate signal is generated during the short period of range switching, tail cone blanking, and for a short interval during scan reversal time when in sector scan. This gate signal blanks the flying spot scanner 41 and another gate exposes light source 136A of known intensity.

Regulated standard lamp 136A is sampled when shutter 127 is opened during each radar scan (under the control of shutter control 124), range switching, or manual calibration. Graduated neutral density filters 136–138 are oriented to attenuate the light from standard lamp 136A for each signal channel so that calibration levels are nulled against their respective automatic gain control reference levels. The resulting D.C. levels of output of operational amplifiers 141–143 are set at zero. Light from standard lamp 136A is transferred through optical fiber bundles 144–146 to the faces of corresponding PMT's 3–5. The sample gate via corresponding gates 147–149 has now applied a reference level to the operational amplifiers 141–143. Comparison here is made between the reference levels and the D.C. levels developed in the PMT's (3–5). Any level other than zero represents an error signal that is applied to the AGC circuits 151–153 via gates 154–156 (see also FIGURE 5). Relays in the AGC 151–156 circuits determine the rotational direction of motors 157–159 that drive variable resistors 161–163 controlling the high voltage applied to the PMT's 3–5.

The unwanted absorption of light within one color channel by the modulation of the dye in another channel creates "color crosstalk." Six possible crosstalk possibilities exist since each of the three colors can be affected by two other channels. The crosstalk effect is due to overlapping spectral characteristics of the three dyes used in color film and varies from film type to film type. Appropriate selection of film characteristic will reduce four of the six crosstalk possibilities, and an electronic masking circuit, contained within the crosstalk network and line driver 164, substantially cancels the remaining crosstalk. In general, this crosstalk effect is one of percentage of unwanted modulation. For example, 90% modulation of one spectral band (green for example) may cause 9% modulation in the blue spectral band. Since the blue transmission is being modulated by its own respective dye, the amplitude of the green crosstalk into the blue signal will vary with the amplitude of the blue signal. The crosstalk can be compensated by multiplying the blue signal by the inverse of 10% of the green signal. In a practical construction of the invention, compensation is performed by "discrete multiplication." This technique is based on compensating each of the blue-signal level detectors independently by summing the green signal with the blue signal to cancel the crosstalk. Since each level detector must be compensated for only one level of blue signal, the "multiplication" is performed by selection of the proper ratios of summing resistors in the crosstalk network. The crosstalk compensating network (164) operates on the basis of inverting the signal from one channel and adding a portion of the inverted signal to any channel in which light is being modulated by the first channel.

Both horizontal and vertical aspect angle affects radar returns due to the distribution of radiated energy and the angle of incidence of the energy beam striking the reflecting surface.

A separate radar reflectivity code may be employed to distinguish those objects which, because of their nature, are only radar-significant at low aircraft altitudes; i.e. radio, TV, and electrical transmission power line towers, water tanks, etc. These objects are specially encoded on the map and the special effects computer 71 generates corresponding signals in response to inputs derived from such special codes. A separate radar reflectivity code is used to distinguish "low altitude targets." These targets reflect relatively little energy from steep angles and long ranges. However, when viewed from near horizontal angles these vertical projections intercept and reflect considerably more energy than the surrounding terrain. In accordance with the present invention, a special coding and decoding technique is employed whereby these special targets can be modulated independent of other reflectivity data.

The increasing series of reflectivity voltages represent water, land, special targets, cultural 1, cultural 2 and cultural 3. Thus as the map is scanned, the reflectivity signal consists of a voltage which varies in accordance to the above code. This signal is peak clipped such that only the water and land signals are passed. A second circuit base clips the reflectivity such that only the cultural 1, 2 and 3 signals are passed. These signals are then summed to reproduce the reflectivity signal, less the special target signals. A third circuit both base-clips and peak-clips the reflectivity signal such that only the special target signals are passed. In order to avoid false signals from being generated during the transition between land, and cultural 1, a gate signal is generated. This gate signal prevents any special target signals from being generated unless the derivative of the input is zero. Thus, a transition through the special target signal level is not sufficient to trigger the generation of the special target output. However, if the signal is at the proper amplitude and its derivative is zero, an output signal is generated. The reflectivity signal is thereby broken down into its two components, normal targets and special targets. Each signal is then modulated in accordance with its respective characteristics and recombined. Thus, at low elevation viewing angles, the special target signals are increased in amplitude while normal targets are decreased. The converse is true for high elevation angles.

The energy distribution affects not only the signal strength but also the resolution capability in range and azimuth. In the present invention the azimuth beam width of the radar energy pattern is simulated by spreading the scanning light source (41) as a function of slant range, tangential to the scan direction. The vertical aspect and beam pattern computer 69 together with the tangent computer 165 modify the flying spot scan to simulate these radar effects. The azimuth beamwidth is approximated by the spot diameter of the image light source on the map at high incidence angles (directly below the aircraft) and is modulated at a low frequency by jizzle generators 176 and 177 (see FIGURE 4) to produce beamwidth-spreading as a function of slant range.

In addition to signal strength variations, this simulation technique provides the azimuth resolution degradation produced by antenna beamwidth and contributes to directional effects so that the targets are resolvable. In addition to this azimuth resolution effect, there is a similar range effect. The ground range resolution never exceeds the slant range resolution and, for high incidence angles and high elevations, is considerably degraded. Simulation of this ground range resolution effect is inherent in the scan converter operation (81). The data, as read from the map, is temporarily stored by the scan converter in a single line with data positioned along the line as a function of slant range. Scan conversion devices suitable for converting the map scanning rate to a radar scan rate are well known to those versed in the art and are, for example, used to convert television pictures from one scanning standard to another. A typical one of such devices is based on storing the video as a static charge on a screen of dielectric material. This is accomplished by intensity modulating a writing electron beam as it is scanned across a storage dielectric. Once the charge pattern has been written in, it can be read out by scanning the storage screen with an unmodulated electron beam. Depending on the charge pattern, the read electron beam is modulated as it passes through the storage screen to a collector element. Simultaneous write and read modes are possible with the use of two electron guns. The writing beam is deflected as a function of the computed slant range and is intensity modulated with the video signal. The target video signal as stored on the scan converter storage medium is thus displaced as a function of slant range, independent of the map scanning rate. The radar time base is a function of slant range. The reading beam scans the stored video signal at a linear rate starting at the point which corresponds to a slant range of zero. The video is thus read out in real time since the elapsed time is now proportional to the slant range to the targets.

Radar target breakup, as modified by the pilot's gain setting, is simulated by encoding the radar return value (reflectance) on the map as varying densities to green light. The STC and VRF control circuit 166 operates in response to this input to simulate this characteristic. A suitable device to perform the function of the STC and VRF control circuit is the well-known "Photoformer." A photoformer uses a C.R.T. and photodetector in a closed-loop system whereby one axis of C.R.T. deflection is controlled by the photodetector input. The action is such that the C.R.T. spot is deflected toward the edge of an opaque mask placed on the C.R.T. face when the photodetector is stimulated by the light from the C.R.T. spot. The closed-loop (photodetector, spot deflection, C.R.T. spot, mask edge to photodetector) is such that the spot is servo controlled to the mask edge. As deflection is applied to the other deflection axis of the C.R.T., the C.R.T. spot follows the mask edge, thereby, generating a function dependent on the mask shape and the applied deflection.

The vertical beam pattern computer 69B, of which the STC and RF gain circuit 166 is a part, is an application of this well-known technique whereby the photodetector controls the gain of both horizontal and vertical deflection circuits of the C.R.T. The photodetector stimulation increases the gain of both deflection circuits causing the C.R.T. spot to be deflected radially from the zero-zero deflection point in a direction prescribed by the two input signals. The photoformer mask in this case prescribes a figure enclosing the zero-zero deflection point, and the spot deflection is such that the closed-loop servo controls the spot to the mask edge.

As stated hereinabove terrain height is coded in coarse and fine steps. The coarse input is provided through shaping network and line driver 167 whereas the fine data is supplied through shaping network and line driver 168 to the terrain height computer 60. The coarse and fine PMT voltages are combined in computer 60 to form the height analog.

The scale factor computer 169 introduces a change which is a function of altitude so that large signals are available to the tangent computer 165 input at all altitudes. A scale factor function generator 171 generates a signal for use by the scale factor computer 169 and vertical beam computer 69. The automatic low-altitude flight computer 172 simulates low-altitude flight by simulating the pencil beam of the antenna at a selected pitch angle with respect to the aircraft centerline and observing the presence or absence of radar return.

The low-altitude automatic flight computer provides a capibility of making low altitude flights over the terrain by generating the climb and dive rate signals required to follow the terrain contour at a preset clearance. The low altitude flight computer 172 shown in FIGURE 5 simply predicts the vertical flight path based on the aircraft's pitch angle. The terrain data along the flight path is compared with this predicted flight path. If the terrain height plus a preset clearance level is above or below the predicted flight path, the aircraft pitch angle is changed in accordance with the error. The climb/dive rate signals are generated from the aircraft pitch angle, which is computed as a function of the terrain height along the predicted flight path. To insure that the aircraft has sufficient time to maneuver, the terrain height is monitored some distance ahead of the aircraft along the predicted ground course. To maintain a minimum smoothing action, this terrain monitor range is varied as a function of aircraft speed.

Figure 4:
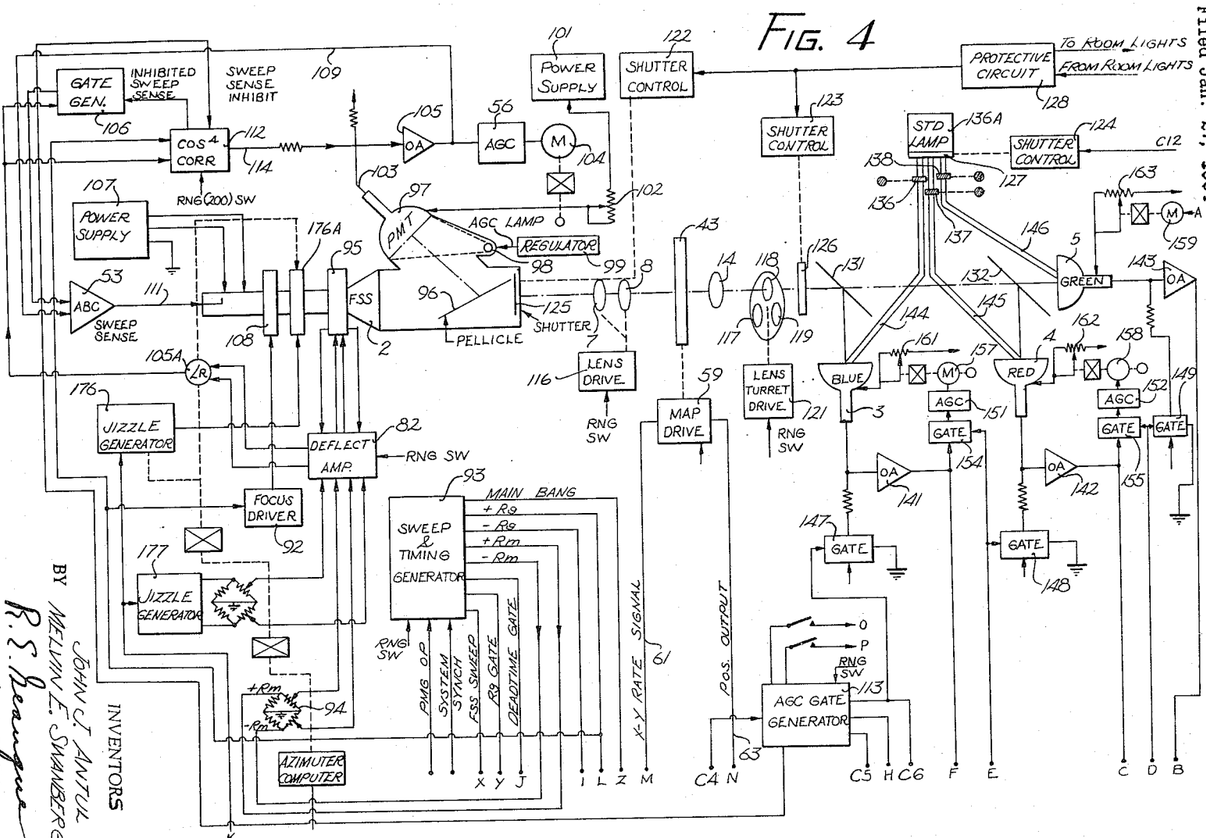
FIGURES 4 and 5 comprise an expanded diagram of the apparatus in FIGURE 3.
Figure 5:
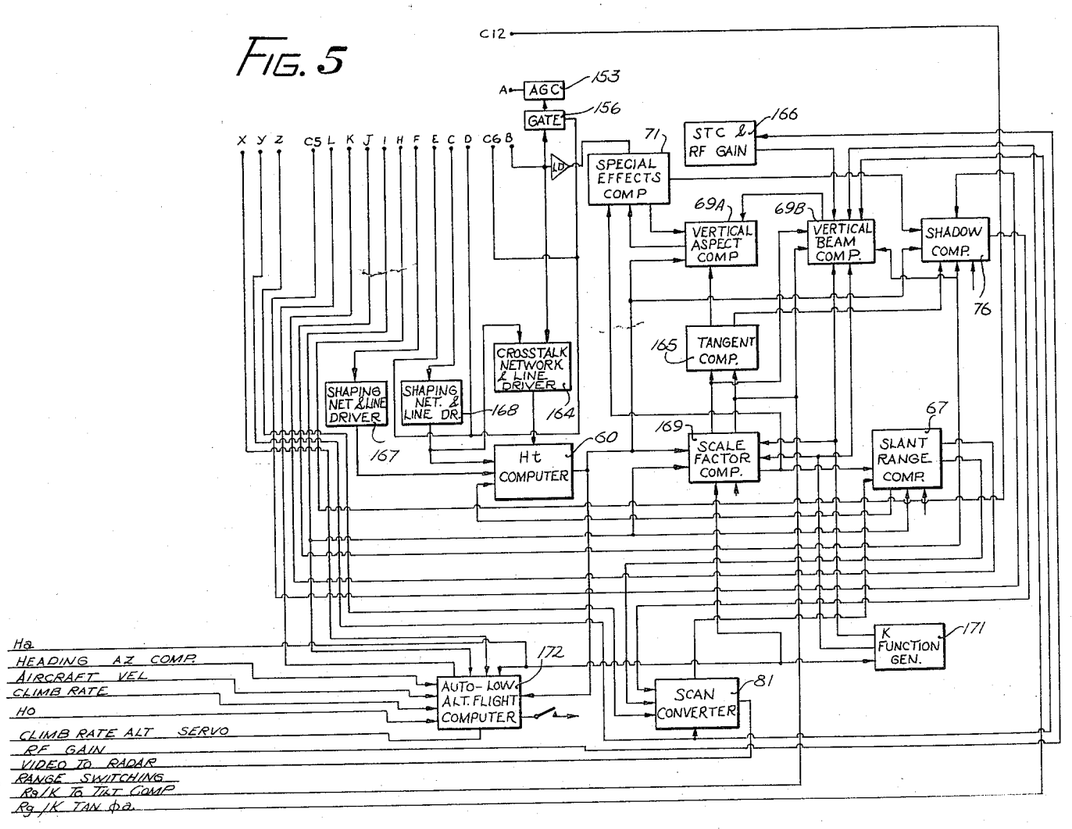

Inasmuch as each of the functional units represented by a rectangle in the block diagrams of FIGURES 3–5, may be any one of the numerous devices for each respective function well known in the art, it is deemed unnecessary to show circuit details. It is considered that the above description is sufficient to enable those skilled in the art to practice it.

The methods and novel apparatus described hereinabove for producing simulated radar video signals from multicolor transparencies represent great improvements over previous methods and devices. The extra dimension offered by multiple colors and associated shades in a single transparency of permanent registration, provides an almost unlimited future growth potential. In addition to immediate land mass simulation applications, the apparatus of the invention has extensive application in future air/space requirements, by reason of the unusually high storage density and resolution inherent in the data storage medium.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, it is intended that the invention be limited only as indicated by the scope of the following claims.

What is claimed is:

1. A radar land mass simulator apparatus comprising:
    a unitary multicolor map having radar reflectance information encoded therein as a function of a first color and terrain elevation information encoded therein as a function of a second color;
    means for scanning said map with a single beam of white light to generate a multicolor light output beam containing said encoded information;
    first and second photoelectric means responsive to corresponding colors in said light output beam for generating video signals to be used in a simulated display of terrain.

2. A radar land mass simulator as defined in claim 1 wherein said first photoelectric means comprises:
    first and second photomultiplier tubes; and
    dichroic filter means interposed in the path of said light output beam for directing light of said first color onto said first photomultiplier tube to generate a first signal corresponding to said radar reflectance information; and directing light of said second color onto said second photomultiplier tube to generate a second signal corresponding to said terrain elevation information.

References Cited by the Examiner
UNITED STATES PATENTS
3,028,684 4/1962 Khanna et al. _________ 35—10.4
FOREIGN PATENTS
1,146,812 5/1957 France.

OTHER REFERENCES
Slattery et al.: I.R.E. Transactions on Military Electronics, vol. MIL. 3, No. 1, January 1959, pp. 75–82 inclusive.

CHESTER L. JUSTUS, *Primary Examiner.*
MAYNARD R. WILBUR, *Examiner.*
T. H. TUBBESING, *Assistant Examiner.*